United States Patent
Ricks et al.

(10) Patent No.: US 7,173,414 B2
(45) Date of Patent: *Feb. 6, 2007

(54) POSITION DETECTION APPARATUS AND METHOD FOR LINEAR AND ROTARY SENSING APPLICATIONS

(75) Inventors: Lamar F. Ricks, Freeport, IL (US); Ryan R. Furio, West Chicago, IL (US); Andrew Nicol, Motherwell (GB)

(73) Assignee: Honeywell International Inc., Morriston, NJ (US)

( * ) Notice: Subject to any disclaimer, the term of this patent is extended or adjusted under 35 U.S.C. 154(b) by 165 days.

This patent is subject to a terminal disclaimer.

(21) Appl. No.: 10/993,964

(22) Filed: Nov. 18, 2004

(65) Prior Publication Data

US 2006/0082363 A1   Apr. 20, 2006

Related U.S. Application Data

(60) Provisional application No. 60/619,748, filed on Oct. 18, 2004.

(51) Int. Cl.
 *G01B 7/30* (2006.01)
(52) U.S. Cl. .............................. 324/207.25; 324/207.24
(58) Field of Classification Search ..............................
 324/207.24–207.25
 See application file for complete search history.

(56) References Cited

U.S. PATENT DOCUMENTS

| | | | |
|---|---|---|---|
| 5,351,003 A | 9/1994 | Bauer et al. | |
| 5,589,769 A | 12/1996 | Krahn | 324/207.26 |
| 6,097,183 A | 8/2000 | Goetz et al. | 324/207.12 |
| 6,445,176 B1 | 9/2002 | Wallrafen | |
| 6,509,732 B1 | 1/2003 | Rhodes et al. | 324/207.12 |
| 6,731,108 B2 | 5/2004 | Zalunardo et al. | 324/207.2 |
| 6,750,644 B1* | 6/2004 | Berkcan | 324/117 R |
| 6,757,635 B2 | 6/2004 | Topmiller | 702/150 |
| 2003/0076090 A1 | 4/2003 | Muth | |

FOREIGN PATENT DOCUMENTS

WO   WO 01/77622 A2   10/2001

\* cited by examiner

*Primary Examiner*—Bot LeDynh
(74) *Attorney, Agent, or Firm*—Kermit D. Lopez; Luis M. Ortiz

(57) ABSTRACT

A position detection system and method for linear and rotary sensing applications are disclosed herein, including a plurality of magnetoresistive sensing components for linear and rotary detection sensing, and an integrated circuit for amplifying and calibrating signals generated by the magnetoresistive sensing components in order to provide a full digital calibration and a ratio-metric output voltage or digital output signal indicative of linear and rotary position data.

19 Claims, 9 Drawing Sheets

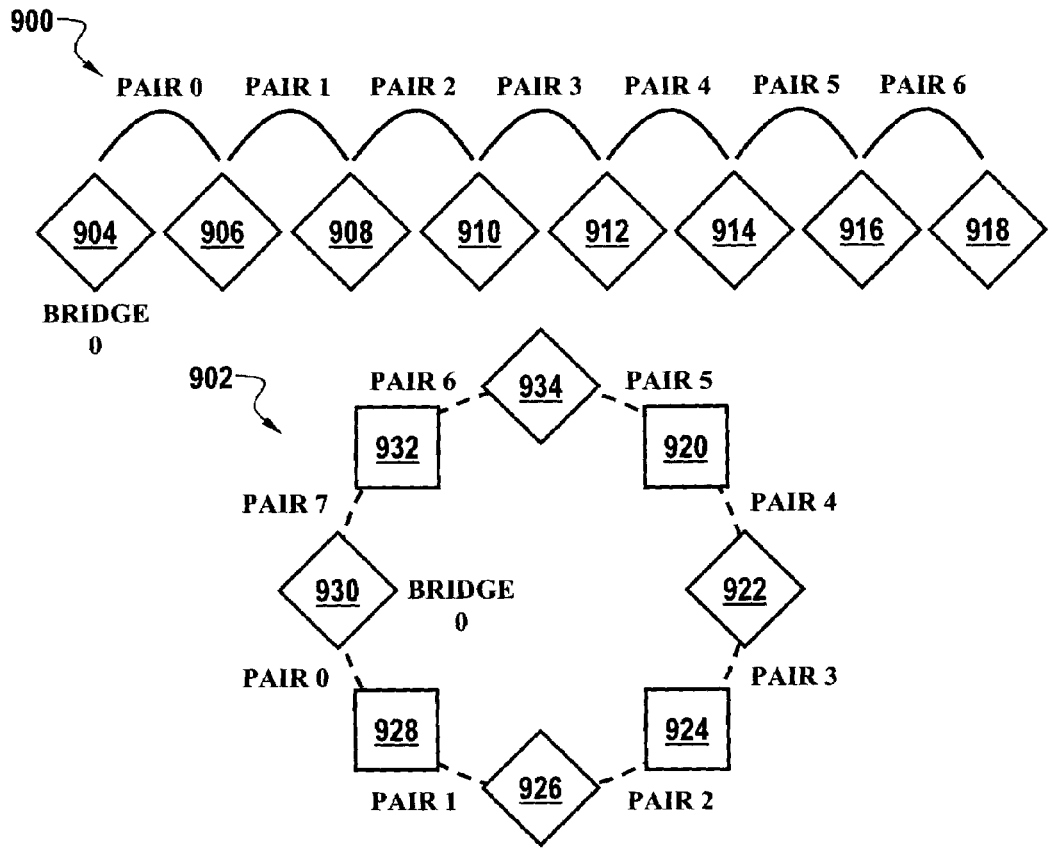
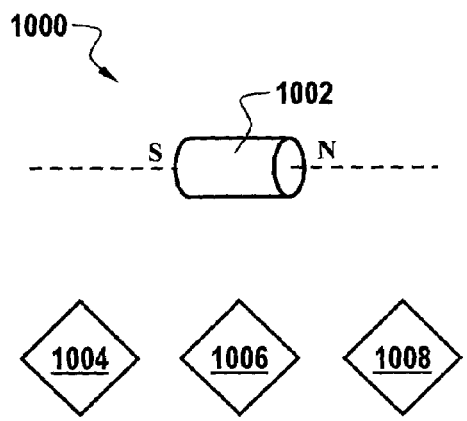
Fig. 10
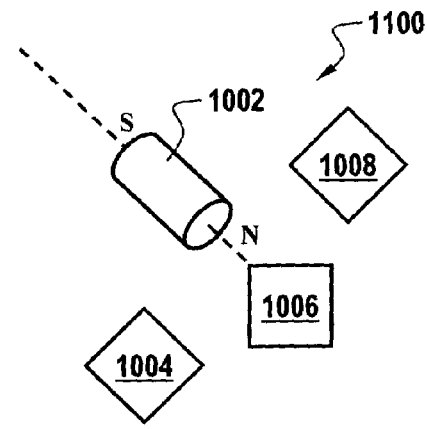
Fig. 11

| MEASUREMENT NUMBER → | 0 | 1-127 | 128 | 129-255 | 256 | 257-383 | 384 | 385-511 |
|---|---|---|---|---|---|---|---|---|
| ADC1 | AZT1 | B<X> | AZB1 | B<X> | T1 | B<X> | AZB1 | B<X> |
| ADC2 | AZB2 | B<Y> | T2 | B<Y> | AZB2 | B<Y> | AZT2 | B<Y> |

POSITION DETECTION APPARATUS AND METHOD FOR LINEAR AND ROTARY SENSING APPLICATIONS

CROSS-REFERENCE TO RELATED APPLICATION

This patent application claims priority under 35 U.S.C. § 119(e) to provisional patent application Ser. No. 60/619,748 entitled "Position Detection Apparatus and Method for Linear and Rotary Sensing Applications," which was filed on Oct. 18, 2004, the disclosure of which is incorporated herein by reference.

TECHNICAL FIELD

Embodiments are generally related to sensor methods and systems. Embodiments are also related to position detection devices. Embodiments are additionally related to magnetic sensors. Embodiments also relate to methods and systems for linear and rotary sensing applications.

BACKGROUND

Magnetoresistive (MR) array technology is utilized in a variety of commercial, consumer and industrial detection applications. In some conventional MR systems an apparatus can be provided for determining the position of a member movable along a path. In such a device, a magnet can be attached to the movable member and an array of magnetic field transducers are located adjacent the path. As the magnet approaches, passes and moves away from a transducer, the transducer provides a varying output signal, which can be represented by a single characteristic curve that is representative of any of the transducers.

To determine the position of the movable member, the transducers are electronically scanned and data is selected from a group of transducers having an output that indicates relative proximity to the magnet. A curve-fitting algorithm can then be utilized to determine a best fit of the data to the characteristic curve. By placement of the characteristic curve along a position axis, the position of the magnet and therefore the movable member may be determined.

In another conventional MR device, a position determining apparatus can be implemented, which includes a magnet that is attached to a movable member that moves along a predefined path of finite length. An array of magnetic field transducers can be located adjacent to the predefined path. The transducers can provide an output signal as the magnet approaches passes and moves away from each transducer. A correction mechanism can also provided to correct for residual error caused by the non-linearity of the transducers.

Such a correction mechanism preferably approximates the residual error with a predetermined function, and applies correction factors that correspond to the predetermined function to offset the residual error. By correcting for the non-linearity of the transducers, the length of the magnet may be reduced and/or the spacing of the transducers may be reduced.

An example of a conventional magnetic sensing approach is disclosed, for example, in U.S. Pat. No. 5,589,769, "Position Detection Apparatus Including a Circuit for Receiving a Plurality of Output Signal Values and Fitting the Output Signal Values to a Curve," which issued to Donald R. Krahn on Dec. 31, 1996, and is assigned to Honeywell International Inc. Another example of another conventional magnetic sensing approach is disclosed in U.S. Pat. No. 6,097,183, "Position Detection Apparatus with Correction for Non-Linear Sensor Regions," which issued to Goetz et al. on Aug. 1, 2000 and is also assigned to Honeywell International Inc. U.S. Pat. Nos. 5,589,769 and 6,097,183 are incorporated herein by reference.

Such conventional MR-based devices generally utilize discrete components on a Printed Circuit Board (PCB) assembly to yield the resulting function. A discrete component-based solution is generally expensive. Based on the foregoing, it is believed that a solution to the above-referenced problems lies in the design and development of an improved integrated circuit, which can provide a full digital calibration procedure and generate ratiometric or digital output signals indicative of rotary and position sensing information.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for improved sensor methods and systems.

It is another aspect of the present invention to provide for an improved position detection device It is a further aspect of the present invention to provide for an improved AMR sensor.

It is an additional aspect of the present invention to provide for improved linear and rotary sensing applications.

The aforementioned aspects of the invention and other objectives and advantages can now be achieved as described herein. A position detection apparatus, system and method for linear and rotary sensing applications are disclosed herein, including a plurality of magnetoresistive sensing components for linear and rotary detection sensing, and an integrated circuit for amplifying and calibrating signals generated by the plurality of magnetoresistive sensing components in order to provide a full digital calibration and a ratio-metric output voltage or digital output signal indicative of linear and rotary position data.

The integrated circuit generally comprises a CMOS circuit, i.e., an ASIC. The magnetoresistive sensing components can comprise, for example, eight AMR bridges for generating position measurement data. The number of magnetoresistive sensing components is not limited to eight AMR bridges. Any amount greater than or equal to two AMR bridges can be implemented. For illustrative purposes, however, the embodiment disclosed herein is based on an eight AMR bridge configuration.

The integrated circuit generally includes an internal temperature reference for temperature measurement and error correction of the signals generated from the AMR bridges, along with an input multiplexed circuit for sampling data generated by a specific AMR bridge among the AMR bridges for position determination. The integrated circuit further includes an analog-to-digital converter for converting amplified signals relative to an associated supply voltage, an EEPROM wherein calibration coefficients for the AMR bridges are stored, and a controller that calculates a normalized bridge output value generated by at least one AMR bridge among the AMR bridges.

Position information can be determined from normalized bridge output signals generated by two adjacent AMR bridges. The integrated circuit can also include a master-slave circuit that allows a plurality of such integrated circuits to be daisy-chained together when the plurality of magnetoresistive components comprises more than the eight AMR bridges.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

FIG. 9 illustrates respective block diagrams depicting linear and contiguous bridge array arrangements, in accordance with embodiments;

FIG. 10 illustrates a schematic diagram depicting an axial magnet orientation configuration, in accordance with one embodiment;

FIG. 11 illustrates a schematic diagram depicting a radial magnet orientation configuration, in accordance with one embodiment;

DETAILED DESCRIPTION

The particular values and configurations discussed in these non-limiting examples can be varied and are cited merely to illustrate at least one embodiment and are not intended to limit the scope of the invention.

Figure 1:
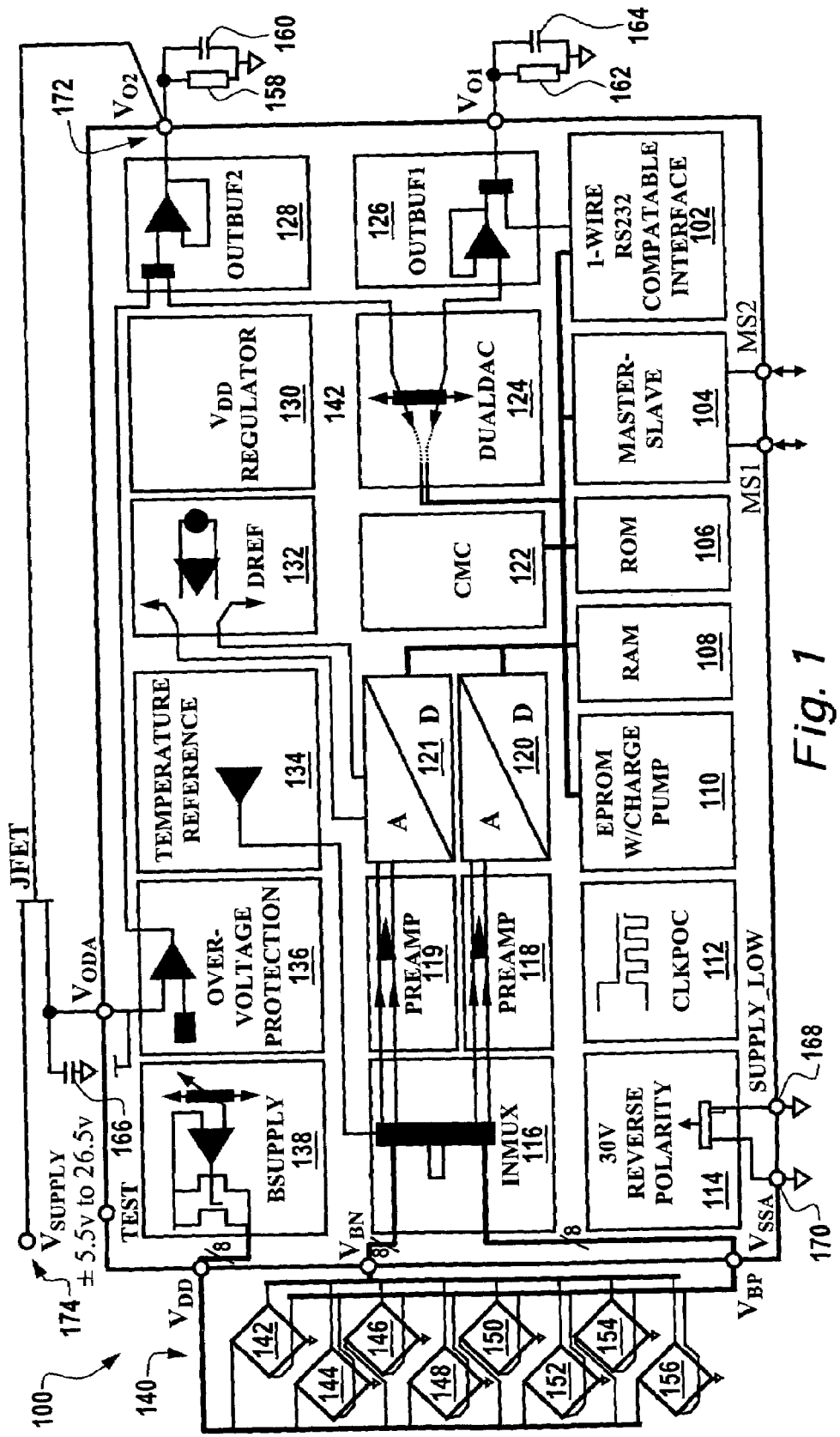
FIG. 1 illustrates a schematic diagram of an integrated circuit, which can be implemented in accordance with a preferred embodiment.

FIG. 1 illustrates a schematic diagram of an Application-Specific Integrated Circuit (ASIC) 100, which can be implemented in accordance with a preferred embodiment. Integrated circuit 100 can be implemented as a Complementary Metal-Oxide Semiconductor (CMOS) circuit for amplifying and calibrating signals generated by a group 140 of anisotropic magnetoresistive (AMR) positions sensors or AMR bridges 142, 144, 146, 148, 150, 152, 154, and 156. ASIC 100 can provide a full digital calibration procedure that generates a ratiometric output or digital output signal. ASIC 100 generally perform firmware-encoded Digital Signal Processor (DSP) algorithms, which can be based on position algorithms associated with sensor inputs. In general, FIG. 1 depicts a high-resolution analog ratiometric output configuration.

In general, the eight AMR sensors or bridges 142, 144, 146, 148, 150, 152, 154, and 156 can be utilized for the measurement of position. ASIC 100 possess an internal temperature reference 134 that can be utilized to provide an optional temperature measurement and error correction of bridge inputs. Note that although eight AMR bridges 142, 144, 146, 148, 150, 152, 154, and 156 are depicted in accordance with the embodiment of FIG. 1, other configurations can be implemented, such as a configuration involving 2 bridges, 3 bridges, 4, bridges, 16, bridges, 32, bridges, and so forth. The use of eight AMR bridges is not considered a limiting feature of the embodiments disclosed herein, but is referred to for illustrative and general edification purposes only.

An input multiplexer (INMUX) 116 samples the required AMR bridges 142, 144, 146, 148, 150, 152, 154, and 156 for position determination, an internal band gap/PTAT value, and corresponding auto-zero values of the analog signal path of ASIC 100. The AMR bridges 142, 144, 146, 148, 150, 152, 154, and 156 are generally supplied a voltage proportional to $V_{DDA}$ generated by a bridge supply (BSUPPLY) 138. In considering the functionality of BSUPPLY 138, it is important to realize that the two bridges can be driven to voltage $V_{DD}$ during the measurement cycle. Only the bridges being measured are powered in order to reduce power consumption.

A chopper stabilized amplifier followed by a full differential amplifier can be utilized for pre-amplification of the multiplexed signals as indicated by a pre-amplifier circuit (PREAMP) 118 and/or 119, which receives signals from INMUX 116. Note that all necessary measurements performed via ASIC 100 can be accomplished in a particular order determined by associated Calibration Microcontroller (CMC) firmware associated with a CMC 122. The INMUX 116 can select one of the following signals: differential bridge voltage of odd/even bridge (position 1); internal temperature value (PTAT), i.e., temperature; and or a shorted input (auto-zero). The common mode voltages (auto-zero) can be obtained by shorting the differential inputs in the INMUX 116, while a measurement is referenced to an internal voltage divider reference value.

An analog-to-digital converter (ADC) 120 and/or ADC 121 can receive one or more signals generated by PREAMP 118 and/or 119. ADC 120 and/or ADC 121 can convert the amplified signals generated by PREAMP 118 and/or 119 relative to a supply voltage provided a reference circuit (DREF) 132 into the digital domain. In the system of ASIC 100, the odd and even numbered bridges of the group 140 of AMR bridges 142, 144, 146, 148, 150, 152, 154, and 156 can be converted by separate PREAMP/ADC circuit paths. Note that each preamplifier PREAMP 118 and/or 119 can be composed of two stages. One A/D can be utilized to multiplex all of the AMR bridge signals through and achieve ultimate accuracy because all of the gain and offset errors of the analog circuitry that occur over temperature are common mode and fall out of the math in the algorithm. 2 A/D's can be utilized, however, to achieve a faster response time.

The input amplifier can be implemented as a chopper-stabilized instrumentation amplifier with very high input impedance designed for low noise and low drift. PREAMP 119 and/or 119 can contain three selectable gain values to match with varying AMR bridge sensitivities. The middle gain setting can, for example, amplify 24 mV/$S_{ignal}$ sensitivity as the nominal sensitivity. The high and low gain settings can cover the extents of the known range of sensitivities. An additional gain value can be utilized for the internal temperature signal. The second stage can be implemented as a full differential amplifier for driving inputs to ADC 120 and/or 121.

Note that ADC 120 and/or 121 can be implemented as 13-bit second-order charge-balancing analog-to-digital converters designed in association full differential switched capacitors for converting the various signal to the digital domain. This principle offers the following advantages. First, a high noise immunity can be implemented because differential signal path and integrating behavior. Second, independent from clock frequency draft and clock jitter can result from such a configuration. Third, a fast conversion time due to a second-order mode can be provided.

Utilizing a set of calibration coefficients for each bridge stored in an EEPROM 110, a 16-bit RISC controller (CMC) 122 can calculate a normalized bridge output value. From this value, position information can be determined based on a position algorithm, including corrections for mechanical placement error of the AMR bridges 142, 144, 146, 148, 150, 152, 154, and/or 156. The resulting position can be output in one of four possible manners: 2-wire analog ratiometric, 1-wire analog ratiometric, 1-wire digital and 4-wire push-pull programmable operate/release points. Note that other electrical output formats can be utilized, such as, for example, Pulse Width Modulated (PWM) are also possible and were just not designed into this first ASIC. However, we should mention in the claims that this is also one of the output formats).

A 1-wire RS232 compatible interface 102, for example, can be utilized during the calibration process to allow the calibration hardware to read the raw values of each sensor and write back the calculated coefficients into the EEPROM 110. The same protocol can be utilized as an output signal when a digital output mode is enabled. Note that RS232 compatibility does not refer to electrical compatibility, but generally indicates data of 0 and $V_{DD}$, rather than −8V to +8V. Note that in order to minimize digital noise and to reduce current consumption, the digital section of ASIC 100 can run with a reduced supply voltage of approximately 2.5 V. A band gap regular 130 (i.e., VDD regulator) of ASIC 100 can generate such a voltage.

A master-slave circuit 104 can be included to allow multiple ASICs to be daisy-chained together for large systems of more than 8 bridges. For the master-slave function of master-slave circuit 104, one ASIC can be configured as a "master" and can request position information from the entire set of slave ASICs. Each ASIC can hold the calibration coefficients for each of its bridges to reduce overhead on the master ASIC. During calibration of systems configured for master-slave arrangements, test points should be available to set each ASIC in a master or slave mode prior to the beginning of calibration.

In general, EEPROM 110, Random Access Memory (RAM) 108, Read Only Memory (ROM) 106, master-slave circuit 104 and the 1-wire RS232 compatible interface 102 communicate with CMC 122. Note that ROM 106 can be implemented as a metal-mask programmable ROM that contains program routines including various test routines, and may possess approximately 2.0–2.5 k 16-bit instructions. RAM 108 can be implemented as an integrated dual port RAM that possesses 32×17 bits to allow a permanent parity check of its contents.

EEPROM 110, which functions as a coefficient memory unit, can contain the calibration coefficients for gain, offset, etc, along with configuration bits, such as zero point, operation modes and so forth. EEPROM 110 can also contain two 16-bit words for user programmable identification data. In general, EEPROM 110 can be configured to contain eighty 16-bit words blocked into two regions. The first 64 words are intended for calibration/configuration and identification and can be locked down. The second region can contain end user programmable registers and may be locked with a separate lock bit. Each region is independent covered by a checksum for coherency. When programming EEPROM 110, an internal charge pump can be utilized.

After a Power-On-Reset (POR) performed by a clock generator (CLKPOC) 112, a program provided by ROM 106 can initiate downloading the configuration registers and coefficients from EEPROM 110, including a coherency (CRC) check. Next, a master ASIC can perform a "brute force" search to determine the initial position of the target to be sensed. Once the position of the target is determined, the CMC 122 can track the movement direction and select only the required AMR bridges among 142, 144, 146, 148, 150, 152, 154, and/or 156.

ASIC 100 generally provides considerable configurability for its operating and output modes. The system connections and EEPROM configuration values of ASIC 100 can determine the operating mode of a particular system set up. For each application, a configuration set should be established (i.e., generally prior to calibration) by programming the on-chip EEPROM 110 to one or more modes. Such modes can be designated as a sensor channel mode, CMC mode, and/or analog output mode.

The sensor channel mode enables temperature conversion if temperature compensation is utilized. The sensor channel mode also involves setting up the total number of sensors in the system. Additionally, the sensor channel mode can indicate if the system (e.g., ASIC 100) is linear or contiguous (i.e., last bridge forms a bridge pair with the firs bridge). Finally, the sensor channel mode sets the gain and offset modes of the PREAMP 118 and/or 119.

The CMC mode involves selecting the allowed time response (e.g., 10 kHz, 5 kHz, 2.5 kHz or 1.25 kHz). The CMC mode also involves enabling or disabling of the master/slave mode. Additionally, the CMC mode can set the number of bridge pairs to measure, along with optionally setting the in-system offset value and/or setting the operate/release points, as well as the hysteresis.

Several electrical output modes are possible and can be user-selected via programming. The output modes can include digital, two-channel high-resolution analog ratiometric (i.e., coarse/fine), single channel low resolution analog ratiometric, operate/release mode, and the optional implementation of over-voltage protection. In general, the external calibration procedure preferably should include normalization of the individual bridges, along with the specification of any nudge parameters for mechanical alignment errors, calculation of bridge pair Fourier coefficients, and the calculation of temperature offset and gain values (e.g., optional/programmable).

Temperature compensation may be an optional step for improving performance at the extended temperature ranges. When temperature compensation is not utilized, the temperature coefficients (e.g., TCo and TCg) can be set to zero. The various modes are described in greater detail herein with respect to varying embodiments in order to facilitate understanding of the preferred embodiment disclosed herein.

Figure 2:
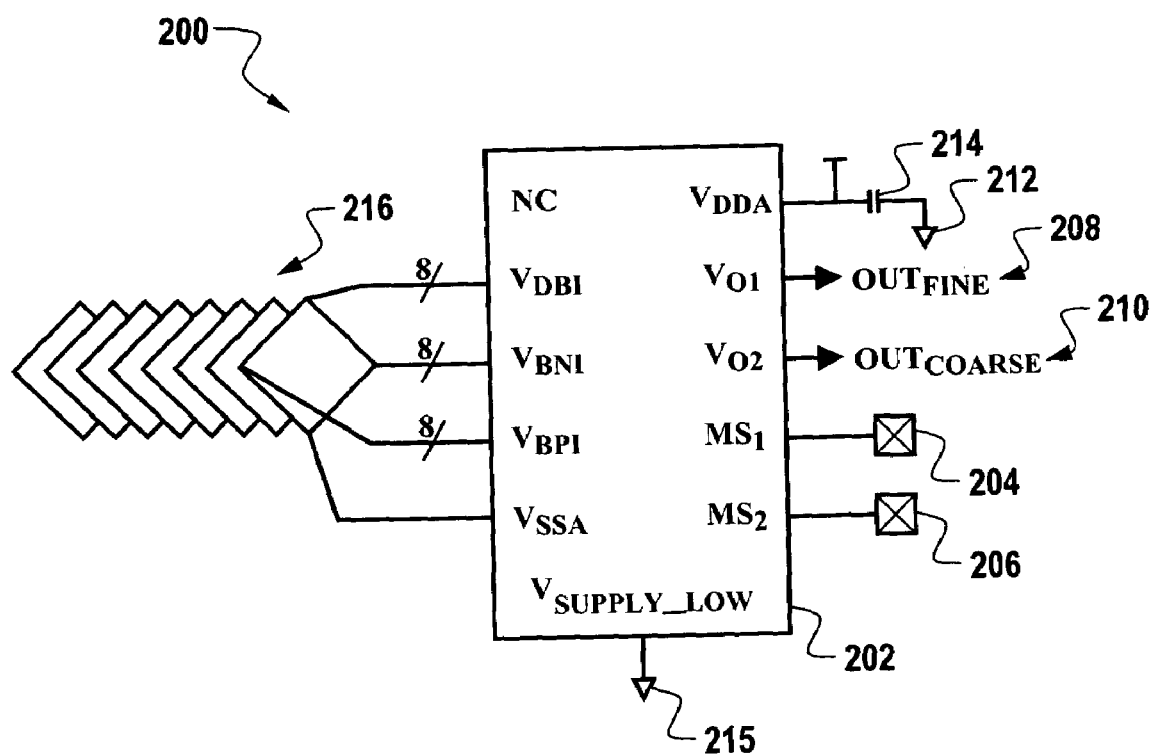
FIG. 2 illustrates a block diagram of a single ASIC, which can be implemented in accordance with an embodiment.

Each ASIC can be connected to up to eight AMR bridges, and a system can be configured with up to 32 AMR bridges and four ASICs, depending upon design considerations. Only the last ASIC in the chain can be populated with less than eight AMR bridges. For a single ASIC mode, two to eight AMR bridges can be utilized. FIG. 2 illustrates an application example that includes eight bridges connected to one ASIC. In general, FIG. 2 illustrates a block diagram of a system 200 that includes a single ASIC 202, which can be implemented in accordance with an embodiment. Note that ASIC 202 of FIG. 2 is analogous to ASIC 100 depicted in FIG. 1.

In the configuration of system 200, eight AMR bridges 216 are connected to ASIC 202, which is coupled to a capacitor 214, which is coupled to a ground 212. Capacitor 214 is generally connected to ASIC 202 at voltage input $V_{DD4}$. A fine voltage output 208 (i.e., $OUT_{Fine}$) can be found at $V_{O1}$ of ASIC 202. Similarly, a coarse voltage output 210 (i.e., $OUT_{coarse}$) can be measured at $V_{O2}$ of ASIC 202. Note that $V_{O1}$ and $V_{O2}$ are the 2 outputs in this mode. Pads 204 and 206 can function as Master-Slave pins, but may not be connected in the configuration of system 200.

Pads 204 and 206 are unused pins, in the configuration of system 200, but might be utilized in accordance with an alternative embodiment. Pads 204 and 206 (i.e., respectively connected to master-slave pins $MS_1$ and $MS_2$) are also illustrated in FIG. 2 as connected to ASIC 202. Additionally, ASIC 202 indicates a voltage supply (i.e., VSUPPLY_LOW) as connected to a ground 215. Note that the eight AMR bridges 216 are connected respectively to ASIC 202 at the following voltage inputs: $V_{DBi}$, $V_{BNi}$, $V_{BPi}$, and/or $V_{SSA}$.

Figure 3:
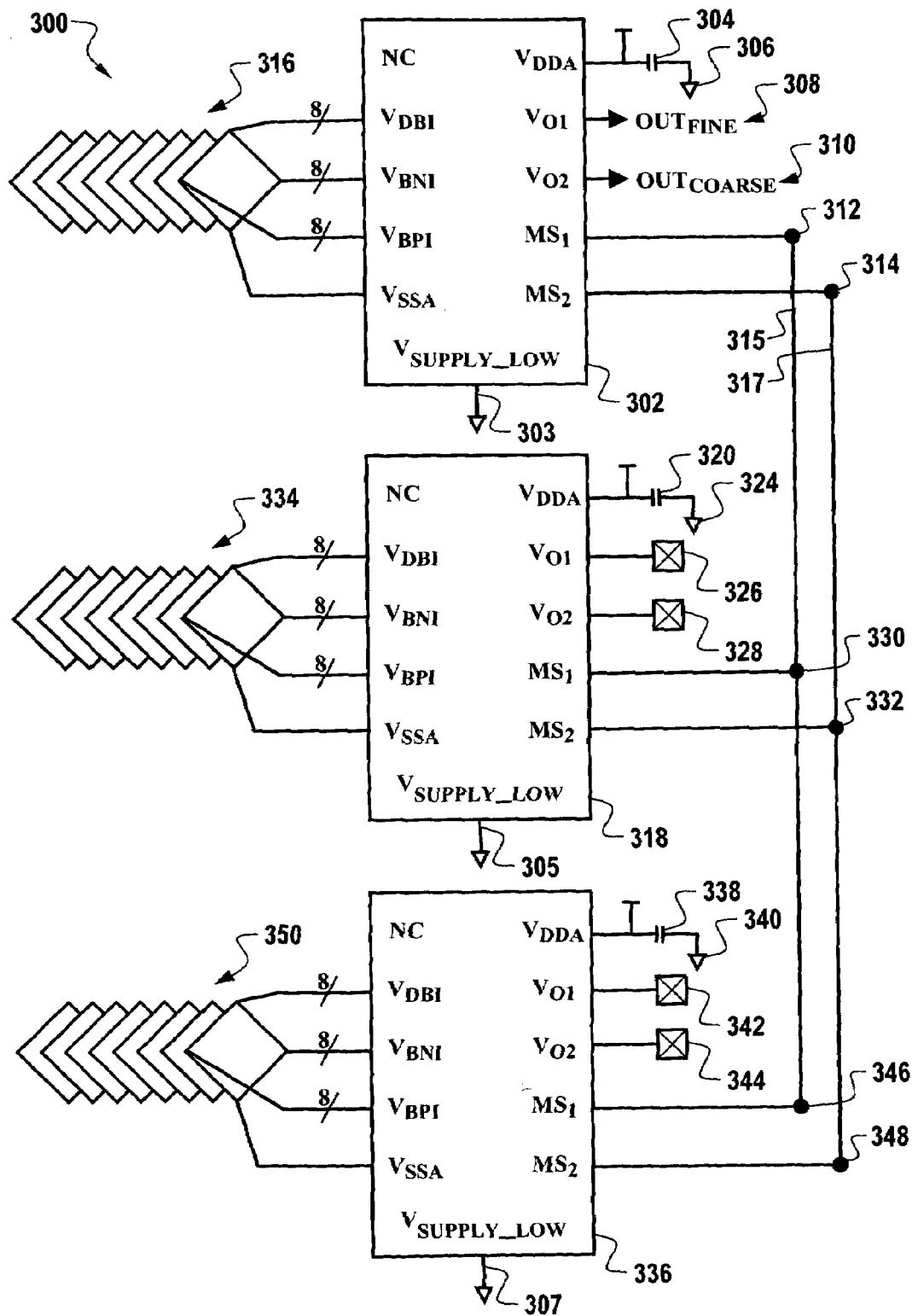
FIG. 3 illustrates a schematic diagram of a master/slave configuration, which can be implemented in accordance with an embodiment.

FIG. 3 illustrates a schematic diagram of a master/slave configuration for a system 300, which can be implemented in accordance with an embodiment. FIG. 3 depicts an example of an application with 24 bridges connected to three ASICs. Note that in the configurations of FIGS. 2–3, the output mode is assumed to be two channel high resolution analog ratiometric (i.e., coarse/fine). Additionally, in FIGS. 2–3, each ASIC EEPROM can contain configuration registers for master/slave, bridge low number, bridge high number and the number of bridges. If the ASIC is configured as a slave, the number bridges can be ignored.

The "master" need not "know" how many "slaves" are connected to it, if any, only how many bridges are in the system. In FIG. 3, system 300 includes 3 ASICS 302, 318, and 336 each respectively connected to 8 AMR bridges. The "master" ASIC performs all position calculations and outputs position information on its respective output pins in the desired format. All ASICs read their own bridges and normalize the measurements before putting the results on the master/slave communication bus 315 and 317. Each ASIC 302, 318 and 336 depicted in FIG. 3 is generally analogous to ASIC 100 depicted in FIG. 1.

When the master requires a particular bridge pair output, it will put a request for the bridge pair on the bus 315 and/or 317. The bus interface of each ASIC 302, 318, and/or 336 can determine if it must supply one or both bridge outputs using its bridge low/high numbers, and if so interrupts its associated CMC (e.g., CMC 122 depicted in FIG. 1) to perform the operation. When finished, the output of the lesser bridge will be transmitted, followed by the output of the greater bridge along with Fourier and nudge coefficient values of the bridge pair. The master bus interface receives these messages and performs the position calculation.

The master bus interface determines whether or not it must respond to the bridge pair requests in exactly the same manner as the slave bus interfaces, and it responds to any requests it has filled by placing its messages on bus 315 and/or 317. The difference is that only the master can make requests and receive response. This approach generalizes bridge measurements so that the master/slave mode is not a special case.

ASIC 302 is connected to a voltage supply (i.e., VSUPPLY_LOW), which is connected to a ground 303. Note that the eight AMR bridges 316 are connected respectively to ASIC 302 at the following voltage inputs: $V_{DBi}$, $V_{BNi}$, $V_{BPi}$, and/or $V_{SSA}$. ASIC 302 is further connected to a capacitor 304, which is coupled to a ground 306. Capacitor 304 is generally connected to ASIC 302 at voltage input $V_{DD4}$. A fine voltage output 308 (i.e., $OUT_{Fine}$) can be provided by ASIC 302 at $V_{O1}$, while a coarse voltage output 310 (i.e., $OUT_{coarse}$) can be provided by ASIC 302 at $V_{O2}$. The absolute position of the target in the entire array can be determined by the information contained in the signals from output pins 308 and 310 of ASIC 302. Nodes 312 and 314 (i.e., respectively connected to master-slave pins $MS_1$ and $MS_2$) are also illustrated in FIG. 3 as connected to ASIC 302. Nodes 312 and 314 are generally connected to the master slave bus lines 315 and 317 respectively.

ASIC 318 is connected to a voltage supply (i.e., VSUPPLY_LOW), which is connected to a ground 305. Note that the eight AMR bridges 334 are connected respectively to ASIC 318 at the following voltage inputs: $V_{DBi}$, $V_{BNi}$, $V_{BPi}$, and/or $V_{SSA}$. ASIC 318 is further connected to a capacitor 320, which is coupled to a ground 324. Capacitor 320 is generally connected to ASIC 318 at voltage input $V_{DD4}$. Note that pins 326 and 328 of ASIC 318 are not connected in this configuration because ASIC 318 is configured as a slave ASIC. Nodes 330 and 332 (i.e., respectively connected to master-slave pins $MS_1$ and $MS_2$) are also illustrated in FIG. 3 as connected to ASIC 318. Nodes 330 and 332 are generally connected to the master slave bus lines 315 and 317 respectively.

ASIC 336 is generally connected to a voltage supply (i.e., VSUPPLY_LOW), which is connected to a ground 307. Note that the eight AMR bridges 350 are connected respectively to ASIC 336 at the following voltage inputs: $V_{DBi}$, $V_{BNi}$, $V_{BPi}$, and/or $V_{SSA}$. ASIC 336 is further connected to a capacitor 338, which is coupled to a ground 340. Capacitor 338 is generally connected to ASIC 336 at voltage input $V_{DD4}$. Note that pins 342 and 344 of ASIC 336 are not connected in this configuration because ASIC 336 is configured as a slave ASIC. Nodes 346 and 348 (i.e., respectively connected to master-slave pins $MS_1$ and $MS_2$) are also illustrated in FIG. 3 as connected to ASIC 336. Nodes 346 and 348 are generally connected to the master slave bus lines 315 and 317 respectively. Bus 315 is therefore tied to nodes 312, 330 and 346, while bus 317 is tied to nodes 314, 332, and 348.

Figure 4:
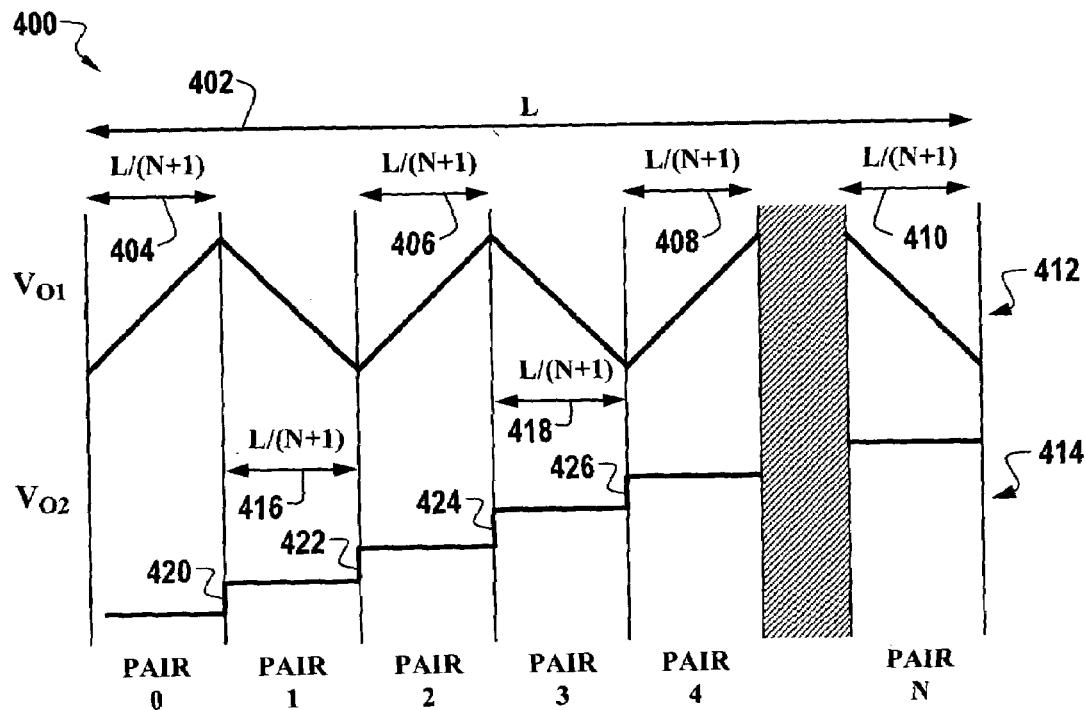
FIG. 4 illustrates a graphical representation of a high resolution analog ratiometric output of the schematic diagram depicted in FIG. 2, which can be implemented in accordance with an embodiment.

FIG. 4 illustrates a graph 400 of a high-resolution analog ratiometric output, which can be implemented in accordance with an embodiment. In general, system 100 of FIG. 1 and/or systems 200, 300 of FIGS. 2, 3 can be configured to provide output position data as an analog or digital signal. The analog output is an analog ratiometric signal in a range of approximately 10% to 90% of VDDA. Note that $V_{O1}$ indicates the magnet's relative position within a segment of the total array, while $V_{O2}$ indicates which specific segment within the array utilizes 1–31 levels. Although the example presented herein illustrates the utilization of two analog ratiometric output signals to achieve a high resolution measurement, it can be appreciated that the utilization of two PWM output signals is also possible.

Note that each segment should preferably be of equal length and is nominally equal to the centerline to centerline distance between each AMR bridge. Due to static mechanical errors from placement tolerances, however, the AMR bridges are typically not placed perfectly and their respective centerline-to-centerline distances are greater or less than the segment width. Therefore, the data for each segment may come from more than one bridge pair. Combining the information from both output signals can yield an absolute position with high resolution. Another electrical output mode is possible and it is a single channel low resolution analog ratiometric output utilizing only $V_{O1}$. In the configuration of FIG. 1, $V_{O1}$ merely indicates the magnet's absolute position within the total array.

FIG. 4 therefore illustrates an example of a high-resolution analog output configuration by depicting the format of the analog output signal for increasing position. This format reduces dV/dt when the magnet crosses over to a new bridge pair, denoted by the vertical lines 420, 422, 424, and 426 depicted in FIG. 4. Horizontal lines 404, 406, 408, 410, 416 and 418 represent segments or portions of length L, depicted by line 402. Note that the portions 412 and 414 of graph 400 are respectively associated with $V_{O1}$ and $V_{O2}$. Note that the variable L represents the total length of the array, while N represents the total number of AMR bridge pairs, wherein each segment is of equal width: L/(N+1).

Figure 5:
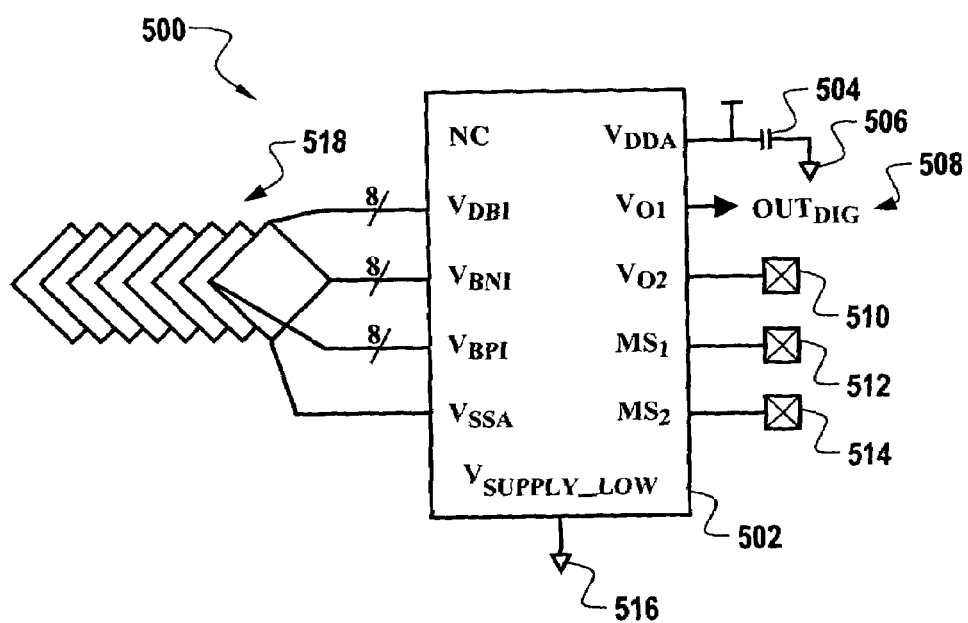
FIG. 5 illustrates a block diagram of a digital output configuration for an ASIC, which can be implemented in accordance with an embodiment.

FIG. 5 illustrates a block diagram of a digital output configuration for a system 500 that includes an ASIC 502, which can be implemented in accordance with an embodiment. Note that ASIC 502 is generally analogous to ASIC 100 of FIG. 1. ASIC 502 is connected to a capacitor 504, which in turn is connected to a ground 506. Capacitor 504 is connected to a $V_{DDA}$ pin of ASIC 502. A digital output signal 508 (i.e., $OUT_{DIG}$) can be derived at $V_{O1}$ of ASIC 502. $V_{O2}$ may be connected to a pad 510. MS1 may be connected to a pad 512. Similarly, $MS_2$ may be connected to a pad 512. Such components or pins may not actually be used in the particular configuration depicted in FIG. 5, but may potentially be utilized in accordance with alternative embodiments, and are illustrated for general edification purposes.

ASIC 502 can also be connected to a ground 516 at $V_{SUPPLY\_LOW}$. Note that the eight AMR bridges 518 are connected respectively to ASIC 502 at the following voltage inputs: $V_{DBi}$, $V_{BNi}$, $V_{BPi}$, and/or $V_{SSA}$. In general, the digital output can be a digital serial RS232-compatible signal at a frequency of approximately 230.4 kbps on $V_{O1}$ (i.e., pin 508). The position is output in two 8-bit chunks with the high-order byte first.

Figure 6:
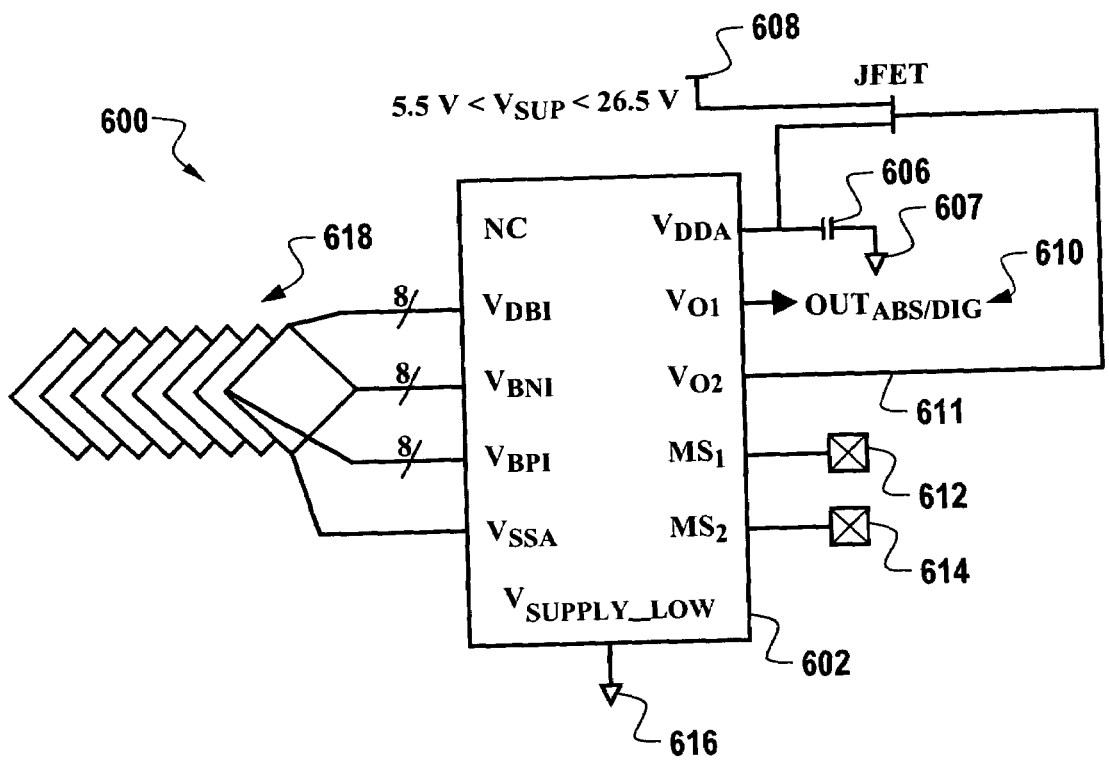
FIG. 6 illustrates a block diagram of an over-voltage protection configuration for an ASIC, which can be implemented in accordance with an embodiment.

FIG. 6 illustrates a block diagram of an over-voltage protection system 600 for an ASIC 602, which can be implemented in accordance with an embodiment. Note that ASIC 602 is generally analogous to ASIC 100 of FIG. 1. ASIC 602 is connected to a capacitor 606, which in turn is connected to a ground 607. Capacitor 606 is connected to a $V_{DDA}$ pin of ASIC 602. Additionally, a JFET transistor 604 is connected to $V_{DDA}$ pin of ASIC 602. JFET transistor 604 is also connected to a "high" voltage 608, which can be in the range of, for example, 5.5V<$V_{SUP}$<V 26.5V. Note that this supply voltage range corresponds to the voltage supply 174 depicted in FIG. 1.

A first voltage output 610 (i.e., $OUT_{AbS/DIG}$) can be provided by ASIC 602 at $V_{O1}$. A JFET transistor 604 can be connected to ASIC 602 at $V_{O2}$. Note that a pin $MS_1$ can be connected to a pad 612, although in alternative embodiments, such components may not necessarily be utilized. Additionally, a pin $MS_2$ can be connected to a pad 614. ASIC 602 can be further connected to a ground 616 at $V_{SUPPLY\_LOW}$. Note that the eight AMR bridges 618 can be connected respectively to ASIC 602 at the following voltage inputs: $V_{DBi}$, $V_{BNi}$, $V_{BPi}$, and/or $V_{SSA}$.

The JFET transistor 604 is utilized to regulate the supply voltage in the range of 5.5V<$V_{SUP}$<V 26.5V for the ASIC supply for ASIC 602. Thus, system 600 of FIG. 6 can implement an over-voltage protection configuration. The EEPROM (e.g., EEPROM 110 of FIG. 1) of ASIC 602 can contain a 3-bit field to trim the cutoff threshold for the JFET gate (i.e., JFET transistor 604). When over-voltage protection is utilized, only $V_{O1}$ can be used for the analog output mode. The high-resolution analog output mode will be unavailable, but the digital output mode remains available.

Figure 7:
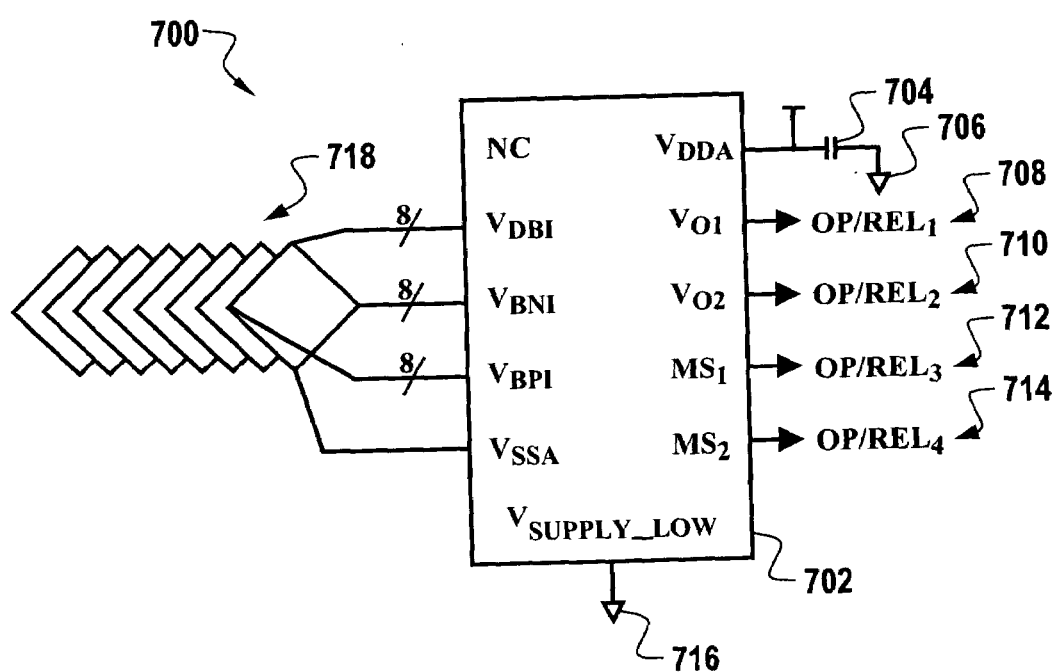
FIG. 7 illustrates a block diagram of an operate/release mode configuration, which can be implemented in accordance with an embodiment.

FIG. 7 illustrates a block diagram of a system 700 that implements an operate/release mode configuration, in accordance with an embodiment. System 700 generally includes an ASIC 702 that is analogous to ASIC 100 of FIG. 1. A capacitor 704 is generally connected to ASIC 702 at $V_{DDA}$. Capacitor 704 is further connected to a ground 706. A first operate/release output signal 708 can be provided at $V_{O1}$ of ASIC 702.

Similarly, a second operate/release output signal 710 can be provided at $V_{O2}$ of ASIC 702. Likewise, a third operate/release output signal 712 can be provided at $MS_1$ of ASIC 702. Finally, a fourth operate/release output signal 714 can be provided at $MS_2$ of ASIC 702. ASIC 702 can be further connected to a ground 716 at pin $V_{SUPPLY\_LOW}$. Note that the eight AMR bridges 718 can be connected respectively to ASIC 702 at the following voltage inputs: $V_{DBi}$, $V_{BNi}$, $V_{BPi}$, and/or $V_{SSA}$.

As indicated in FIG. 7, a single ASIC 700 can be configured to output four push-pull signals as operate/release points. EEPROM registers thereof can be programmed with four operate and four release points, and each point can possess an associated 4-bit hysteresis value. One programmable polarity bit can be available, which applies to all outputs. FIG. 7 therefore illustrates an example of an application that utilizes operate and release points. Since $V_{O1}$, $V_{O2}$, $MS_1$ and $MS_2$ are used for the signals, over-voltage protection and master-slave modes are unavailable.

Figure 8:
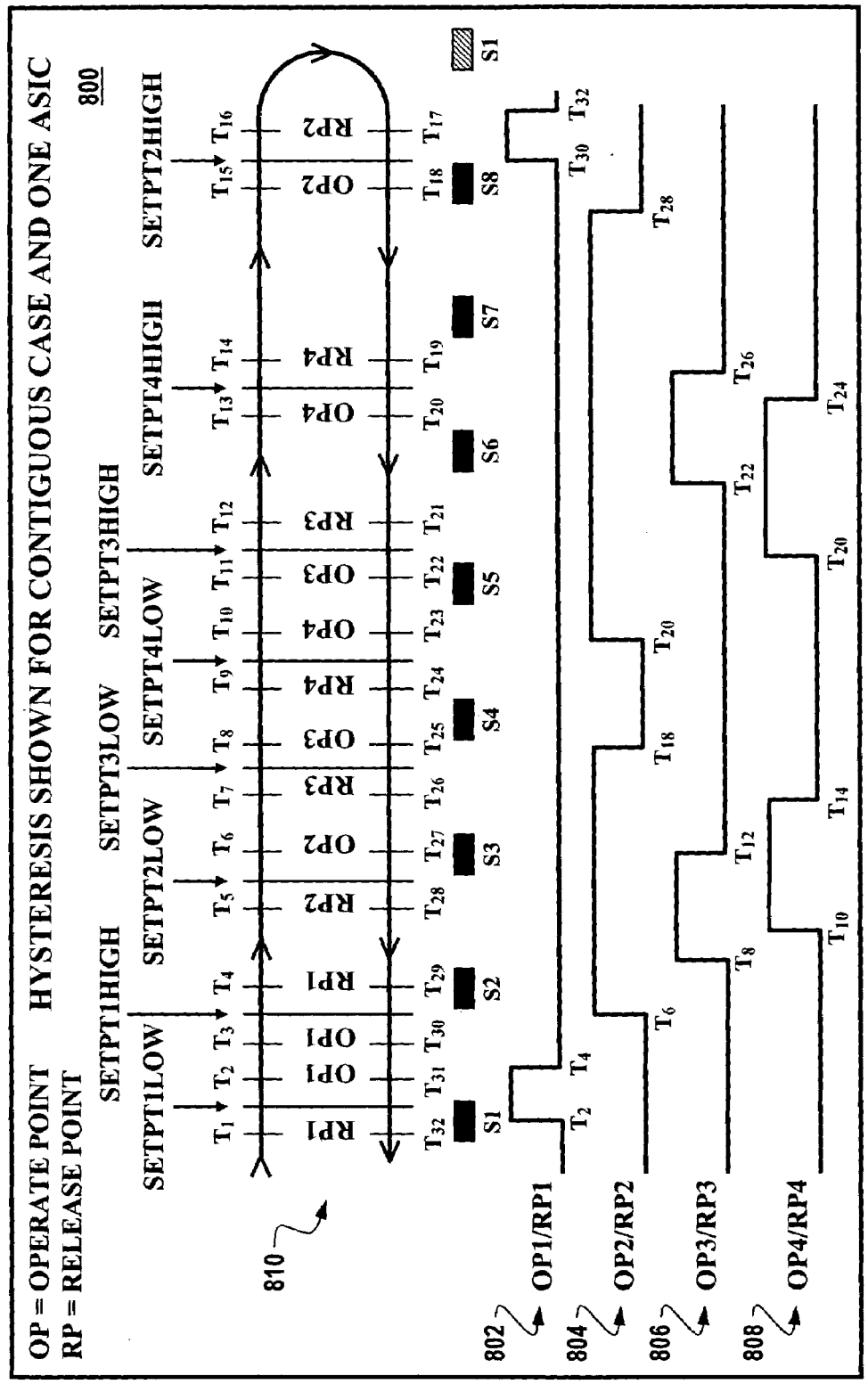
FIG. 8 illustrates a graphical representation of an operate/release mode output associated with the operate/release mode configuration depicted in FIG. 7, in accordance with one embodiment.

FIG. 8 illustrates a graph 800 of an operate/release mode output associated with the operate/release mode configuration depicted in FIG. 7, in accordance with one embodiment. Graph 800 is generally associated with system 700 of FIG. 7. In FIG. 8, section 802 generally represents a first operate point and a first release point; while section 804 represents a second operate point and a second release point. Section 806 represents a third operate point and a third release point, while section 808 represents a fourth operate point and a fourth release point.

Section 810 is indicative of high and low states of system 700 in association with varying operate and release points. In this example diagram, note that the target begins traveling from the centerline of AMR Bridge S1 entirely past the complete array of AMR bridges, ultimately stopping between AMR Bridge S8 and AMR Bridge S1 and thereafter reversing it's course of travel back to the centerline of AMR Bridge S1. Such a configuration is representative of what might occur with a contiguous configuration.

FIG. 9 illustrates respective block diagrams depicting linear and contiguous bridge array arrangements 900 and 902, in accordance with alternative embodiments. Bridge array arrangement 900 is generally composed of AMR bridges 904, 906, 908, 910, 912, 914, 916, and 918. Bridge arrangement 902 is generally composed of AMR bridges 920, 922, 924, 926, 928, 930, 930, 932, and 934. In general, a bridge array can be arranged in a linear configuration as depicted in arrangement 900 or a contiguous circle as indicated by arrangement 902. An incomplete circle, or arc, is simply perceived by the ASIC and associated algorithms as being a type of linear configuration. The bridge array configuration can be set in an EEPROM field in the "master" circuit of a master-slave circuit configuration, so that the coefficient registers for the last bridge contains the Fourier coefficients for the last-to-first bridge pair.

FIG. 10 illustrates a schematic diagram depicting an axial magnet orientation configuration 1000, in accordance with one embodiment. FIG. 11 illustrates a schematic diagram depicting a radial magnet orientation configuration 1100, in accordance with an alternative embodiment. Note that in FIGS. 10–11, identical or similar parts are indicated by identical reference numerals. A magnet 1002 can be oriented in an axial direction as shown in FIG. 10 or a radial direction as shown in FIG. 11, depending upon design considerations. The magnet orientation can be set in an EEPROM master field in the "master" circuit of master-slave circuit configuration, as discussed earlier.

In general, system 100 of FIG. 1 can include a digital-to-analog converter (DUALDAC) 124 that provides an 11-bit ratiometric output for fine position information as well as a 5-bit ratiometric output for coarse position (bridge pair) information. DUALDAC 124 generally provides two outputs, which can be separately controlled by two digital input words. The minimum and maximum output values of DUALDAC 124 can be fixed at 10% and 90% of $V_{DDA}$.

Note that in high resolution analog ratiometric output mode as depicted in FIG. 4, the output of ASIC 100 includes even bridge pairs $V_{O1}$ that start at 10% and end at 90% while the odd bridge pairs $V_{O1}$ begin at 90% and end at 10% (i.e., moving from low to high positions). Such a situation produces a triangular wave form, which can help to reduce large dV/dt and settling times in transition between bridge pairs.

ASIC 100 of FIG. 1 can further include a first output buffer (OUTBUF1) 126 and a second output buffer (OUTBUF2) 128. Note that two rail-to-rail op amps can be configured to function as unity gain buffers, which drive resistive loads (i.e., pull-up or pull-down) as low as 3.5 kΩ and capacitances up to 15 nF. There are four primary output modes. First, in an analog ratiometric mode, $V_{O1}$ can server to buffer the fine position information in the wave form described above (based on a single pair of sensors) and $V_{O2}$ can provide the index of the bridge pair (e.g., 1–31 levels).

Second, in a single output analog ratiometric mode, the output buffer $V_{O1}$ can provide the overall position information from all used AMR bridges among AMR bridges 140 of FIG. 1. For example, with 3 bridges, 10%–50% output can provide position information in the first pair, while 50%–90% can provide position information in the second pair. Note that in either the single output analog ratiometric mode or the digital output mode, the second output (i.e., $V_{O2}$) can be configured to drive a JFET gate regulator. A single analog output mode is possible for systems of up to 16 bridges. A full-scale output (e.g., 10%–90% of $V_{DDA}$) is possible for all numbers of bridge pairs from 1–16.

Third, in a digital output mode, the second output buffer (VO2) may not be used and $V_{O1}$ becomes a digital output containing both the position information as well as the bridge pair index. Fourth, for a set-point configuration, $V_{O1}$ and $V_{O2}$ (along with master-slave pins $MS_1$ and $MS_2$) can be configured as an end-user configurable operate/release outputs with programmable hysteresis. The output buffer $V_{O1}$ can be set as an input for the first 30 mili-seconds after power-on. During this time, commands can be provided over the one-wire RS232 interface 102 of FIG. 1 to alter the calibration or change settings of ASIC 100.

When the power supply associated with ASIC 100 of FIG. 1 exceeds approximately 2.75 V, the re-set signal de-asserts and the clock generator begins functioning. The design clock frequency can be targeted to be approximately 10.24 MHz+/−5% over temperature, depending upon design considerations. Thus, Clock Generator/Power on Clear (CLK-POC) unit 112 of ASIC 100 depicted in FIG. 1 can be configured to possess a feature that permits spread spectrum clocking. When enabled, this mode introduces intentional jitter on the clock source in order to reduce peak EM emissions at any given frequency. The CLKPOC unit 112 also can contain a post-scalar value for oscillatory frequency.

The CLKPOC unit 112 additionally can be configured to contain a post-scalar value that allows the clock frequency to be reduced. Applications that do not require a high response time can select to run at a slower clock frequency and reduced power. This scalar can have the following settings: 1, 2, 4 or 8. The entire ASIC 100 can thus be slowed when utilizing a non-unity post-scalar. For example, if running with a post-scalar of 2, then the baud rate of the digital output would be approximately 128 kHz. To illustrate such features, FIG. 12 depicts a graph 1200 of digital output signals, which can be generated in accordance with an embodiment.

A 16-bit RISC processor specially designed for the requirements of sensor signal conditioning can also be utilized for processing calibration commands, initialization, and permanently calculating the correction formulas and the math of the input-output relation. CMC 122 can be implemented as such a 16-bit RISC processor to perform such tasks. To guarantee a fast response time for changes in position, the sampling control of the inputs predominantly sample position measurements with one additional special measurement of temperature, auto-zero position and auto-zero temperature for every 128 samples of position. For the resulting cycle, which limits the step response only during the special measurement, the sampling rate of the position is slightly more than double the conversion time of one channel, whereas a full cycle for refreshing all values is approximately 384 times the single conversion time.

Figures 12, 13:
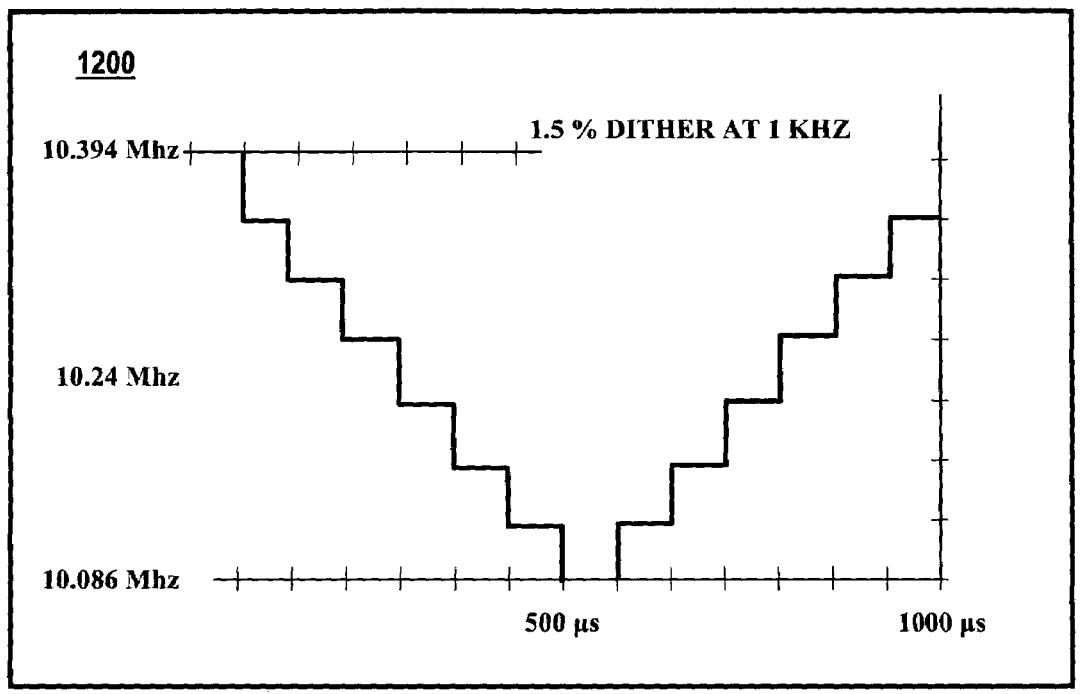
FIG. 12 illustrates a graphical representation depicting spread spectrum clocking, or intentional clock dither, implemented on an ASIC to reduce emissions and improve EMI/EMC performance, in accordance with an embodiment.
FIG. 13 illustrates a table of values generated by a calibration microprocessor, which can be implemented in accordance with an embodiment.

FIG. 13 therefore illustrates a table 1300 of values generated by the calibration microprocessor CMC 122, which can be implemented in accordance with one possible embodiment. Note that in table 1300, the variables T1 and T2 represent measuring the same quantity (i.e., on-chip temperature). The measurement can be alternated between bridges so that AZB<x> (i.e., the more critical special measurement) can be accomplished every 256 cycles.

In general, ASIC 100 communicates via a one-wire serial interface, which allows calibration. Commands are available for operations such as, for example, reading the conversion result of each sensor input with and without auto-zero subtraction; reading the calculation results (i.e., input controls of the DUALDAC 124); writing to the inputs of DUALDAC 124; reading RAM 108; writing to RAM 108; reading from EEPROM 110; writing to EEPROM 110; and other special test modes.

During normal operation, if the user has chosen digital output, the one-wire interface is essentially a half duplex RS232 transmitter operating at a rate of approximately 230.4 kHz, 1 start bit, 8-data bits, and a 1 stop bit. This enables connecting the ASIC 100 directly to any standard microcontroller, or with some minimal electrical interface to the serial port of personal computer (PC) for data acquisition.

It is important to note that the general flow for calibration during assembly can be implemented according to following four primary steps. First, after population of the device or system board, each ASIC must communicate with and be assigned a master or slave status via the ASIC's 1-wire interface. Second, when final assembly is complete, the calibration system communicates with the master ASIC through the 1-wire interface. The master executes the calibration commands requesting data and writing calculated EEPROM coefficients from the design ASIC. Third, once calibration is complete, the calibration lock can be set, which prevents the EEPROM coefficients from being over-written. Fourth, in end-user applications, adjustments can be made for operate/release points as well as system offsets, also through the 1-wire interface. Once this adjustment is complete, an additional lock bit provides security from being over-written later.

Note that many options for calibration can be implemented, in accordance with varying embodiments. For example, an optional two-point temperature calibration for high accuracies especially at the extended temperature ranges can be provided. Although a two-point temperature calibration process is discussed herein, more complex compensation algorithms based on multi-temperature and/or higher order polynomial correction equations may be implemented.

This method can provide a much better correction and a higher performance than what is achieved utilizing a 2-point linear method. A programmable window option can also be implemented that allows overlapping of sensors, which helps the tracking algorithm, especially in fast moving applications. A setting for minimum rise to allow for filtering out tails of the bridge data, which can appear to be valid sensor data (but are not), may also be provided.

Additionally, selecting the best gain/sensitivity range to maximize resolution over the full operation temperature range is also desirable. A calibration field that specifies the zero reference point in the sensor array can be also be provided. In a linear array arrangement, such as that depicted in FIG. 9, the zero point is preferably set between the first two sensors and is not user-programmable. The output can cover the full ratiometric range between the zero point and the last sensor of the array. In a rotary array arrangement (e.g., see FIG. 10), the zero reference point can specify 0° in a 360° circle, and can be user-programmable.

Figure 14:
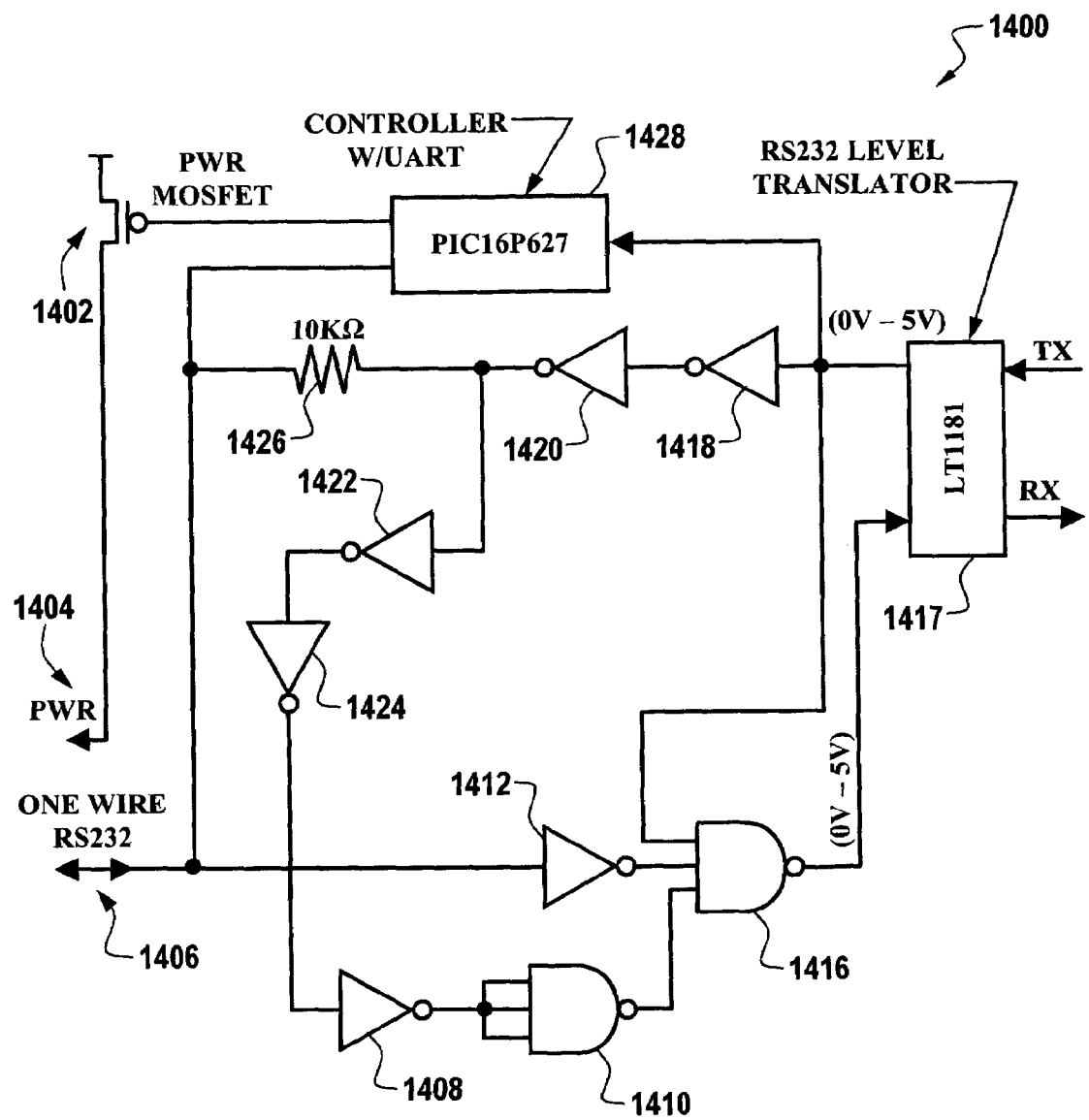
FIG. 14 illustrates a schematic diagram depicting bi-directional (i.e., calibration) communication hardware, which can be implemented in accordance with an embodiment.

FIG. 14 illustrates a schematic diagram depicting bi-directional (i.e., calibration) communication hardware system 1400, which can be implemented in accordance with an embodiment. System 1400 generally permits ASIC 100 of FIG. 1 to communicate during calibration. An RS232 translator chip 1416 can be utilized to translate voltage levels from RS232 levels to 0V to 5V signal levels. When ASIC 100 is in a "listening" mode, its one-wire serial interface will only be weakly pulled "high". This can easily be overridden through the use of a 10 kΩ resistor 1426, so that the command from the PC (not shown in FIG. 16) is received.

When ASIC 100 drives data over its one-wire interface, it does so with a strong push/pull driver that can easily overdrive the 10 kΩ resistor 1426. One remaining problem is then to ensure that the PC does not "listen" to its own commands directed to the ASIC 100. The network of inverter circuits 1408, 1412, 1418, 1420, 1422, 1424 and NAND circuits 1410, 1414 accomplishes this by filtering any low pulses originating from the ASIC 100.

The final problem is that commands can only be received by the ASIC within the first 30 mili-seconds after power-up, which is too brief for a human operator. Therefore, a microcontroller 1428 (e.g., PIC16F627) can be utilized for the task. Microcontroller 1428 monitors commands from the PC, and specifically searches for a BOC (Beginning of Commands) command. Upon receiving a BOC, microcontroller 1428 cycles power to the ASIC 100 (i.e., or the system to which the ASIC is connected) through a PMOST power FET 1402. Microcontroller 1428 then waits approximately 5 mili-seconds and then re-transmits the BOC command to the ASIC 100. Microcontroller 1428 can set its TX pin to a high impedance so as not to interfere with any further transmissions from the PC to the ASIC 100.

Figure 15:
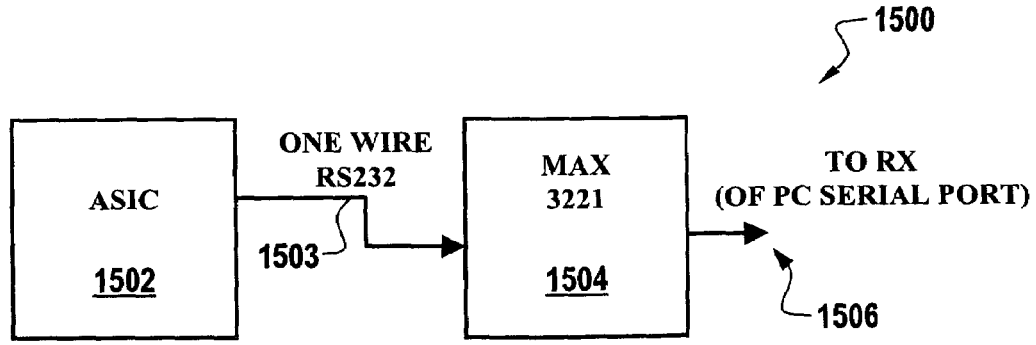
FIG. 15 illustrates a block diagram depicting a system for capturing ASIC position output data in a digital output mode, in accordance with an embodiment.

FIG. 15 illustrates a block diagram depicting a system 1500 for capturing ASIC position output data in a digital output mode using a PC, in accordance with an embodiment. Again, an rs232 level translator chip can be utilized to translate 0V to 5V ASIC logic signals into +/− 8V RS-232 signals. In the example depicted in FIG. 15, a Maxim 3221 integrated circuit (IC) chip 1504 can be utilized. If a system is implemented in which ASIC 100 communicates with microcontroller 1528, then no intermediate circuits are required. The 1-wire digital output 1503 of the ASIC 100 can be directly connected to the RX pin of the microcontroller 1528 or PC as indicated by line 1506 in FIG. 15.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A position detection system for linear and rotary sensing applications, said system comprising:
a plurality of magnetoresistive sensing components for linear and rotary detection sensing; and
a CMOS integrated circuit for amplifying and calibrating signals generated by said plurality of magnetoresistive sensing components in order to provide a full digital calibration and a ratio-metric output voltage or digital output signal indicative of linear and rotary position data.

2. The system of claim 1 wherein said CMOS integrated circuit comprises an ASIC.

3. The system of claim 1 wherein said plurality of magnetoresistive sensing components comprises at least two AMR bridges for generating position measurement data.

4. The system of claim 1 wherein said plurality of magnetoresistive sensing components comprise eight AMR bridges for generating position measurement data.

5. The system of claim 4 wherein said CMOST integrated circuit further comprises an internal temperature reference for temperature measurement and error correction of data input to said eight AMR bridges.

6. The system of claim 4 wherein said CMOS integrated circuit further comprises an input multiplexer circuit for sampling data generated by a specified AMR bridge among said eight AMR bridges for position determination.

7. The system of claim 4 wherein said CMOS integrated circuit further comprises an analog-to-digital converter for converting amplified signals relative to an associated supply voltage.

8. The system of claim 4 wherein said CMOS integrated circuit further comprises an EEPROM wherein at least one calibration coefficient for said eight AMR bridges is stored.

9. The system of claim 8 further comprising a controller that calculates a normalized bridge output value generated by at least one AMR bridge among said eight AMR bridges.

10. The system of claim 9 wherein position information is determined from said normalized bridge output value.

11. The system of claim 1 further comprising a master-slave circuit that allows a plurality of integrated circuits to be daisy-chained together when said plurality of magnetoresistive components comprises more than eight AMR bridges.

12. The system of claim 11 wherein at least one integrated circuit among said plurality of integrated circuits comprises a master that requests position information from at least one slave integrated circuit among said plurality of integrated circuits.

13. A position detection system for linear and rotary sensing applications, said system comprising:
a plurality of AMR bridges for linear and rotary detection sensing;
an ASIC for amplifying and calibrating signals generated by said plurality of magnetoresistive sensing components in order to provide a full digital calibration and a ratio-metric output voltage or digital output signal indicative of linear and rotary position data, wherein said ASIC comprises:
an internal temperature reference for temperature measurement and error correction of data input to said plurality of AMR bridges;
an input multiplexer circuit for sampling data generated by a specified AMR bridge among said plurality of AMR bridges for position determination;
an analog-to-digital converter for converting amplified signals relative to an associated supply voltage;
an EEPROM wherein said plurality of AMR bridges are stored;
a controller that calculates a normalized bridge output value generated by at least one AMR bridge among said plurality of AMR bridges, wherein position information is determined from said normalized bridge output value; and
a master-slave circuit that allows a plurality of ASICS to be daisy-chained together when said plurality of AMR bridges comprises more than eight AMR bridges.

14. A position detection method for linear and rotary sensing applications, said method comprising the steps of:
providing a plurality of magnetoresistive sensing components for linear and rotary detection sensing;
associating a CMOS integrated circuit with said plurality of magnetoresistive sensing components;
automatically amplifying and calibrating signals generated by said plurality of magnetoresistive sensing components via said integrated circuit in order to provide a full digital calibration and a ratio-metric output voltage or digital output signal indicative of linear and rotary position data.

15. The method of claim 14 further comprising the step of configuring said CMOS integrated circuit to comprise an ASIC.

16. The method of claim 14 further comprising the step of configuring said plurality of magnetoresistive sensing components to comprise eight AMR bridges for generating position measurement data.

17. The method of claim 16 further comprising the step of configuring said CMOS integrated circuit to comprise an internal temperature reference for temperature measurement and error correction of data input to said eight AMR bridges.

18. The method of claim 14 further comprising the step of configuring said CMOS integrated circuit to further comprise:
an input multiplexer circuit for sampling data generated by a specified AMR bridge among said eight AMR bridges for position determination;
an analog-to-digital converter for converting amplified signals relative to an associated supply voltage;
an EEPROM wherein said eight AMR bridges are stored;
a controller that calculates a normalized bridge output value generated by at least one AMR bridge among said eight AMR bridges, wherein position information is determined from said normalized bridge output value.

19. The method of claim 14 further comprising the steps of:
providing a master-slave circuit that allows a plurality of integrated circuits to be daisy-chained together when said plurality of magnetoresistive components comprises more than said eight AMR bridges, wherein at least one integrated circuit among said plurality of integrated circuits comprises a master that requests position information from at least one slave integrated circuit among said plurality of integrated circuits.

* * * * *